United States Patent
Honda

(10) Patent No.: US 8,817,861 B2
(45) Date of Patent: Aug. 26, 2014

(54) COMPLEX CONDITION DETERMINATION UNIT, TRANSMISSION DEVICE, COMPLEX CONDITION DETERMINATION METHOD

(75) Inventor: Mitsuhiro Honda, Tokyo (JP)

(73) Assignee: NEC Corporation, Tokyo (JP)

(*) Notice: Subject to any disclaimer, the term of this patent is extended or adjusted under 35 U.S.C. 154(b) by 65 days.

(21) Appl. No.: 13/517,494

(22) PCT Filed: Dec. 14, 2010

(86) PCT No.: PCT/JP2010/072835
§ 371 (c)(1),
(2), (4) Date: Jun. 20, 2012

(87) PCT Pub. No.: WO2011/078097
PCT Pub. Date: Jun. 30, 2011

(65) Prior Publication Data
US 2012/0257665 A1    Oct. 11, 2012

(30) Foreign Application Priority Data
Dec. 21, 2009  (JP) ................ 2009-289089

(51) Int. Cl.
H04B 3/46        (2006.01)
H04L 27/00       (2006.01)

(52) U.S. Cl.
CPC ......... H04L 27/0012 (2013.01); H04L 27/0008 (2013.01)
USPC ........... 375/227; 375/295; 375/302; 455/130; 455/134; 455/135

(58) Field of Classification Search
None
See application file for complete search history.

(56) References Cited

U.S. PATENT DOCUMENTS 6,985,752 B2      1/2006  Takano et al.
2004/0014443 A1*  1/2004  Nakao et al. ............. 455/130

FOREIGN PATENT DOCUMENTS

JP  10-093650 A    4/1998
JP  2003-037554 A  2/2003
JP  2004-056499 A  2/2004
JP  2005-318533 A  11/2005

OTHER PUBLICATIONS

International Search Report of PCT/JP2010/072835 dated Mar. 22, 2011.

* cited by examiner

Primary Examiner — Adolf Dsouza
(74) Attorney, Agent, or Firm — Sughrue Mion, PLLC

(57) ABSTRACT

A complex condition determination unit is provided, having an error-pulse switching determination unit which outputs, as error-pulse determination information, information indicating whether an accumulated value of the number of error pulses is equal to or greater than a predetermined error-pulse threshold value; a CNR (carrier to noise ratio) modulation scheme determination unit which outputs, as CNR determination information, a modulation scheme determined in accordance with CNR information indicating the CNR of the received signal; an RSL (receive signal level) modulation scheme determination unit which outputs, as RSL determination information, a modulation scheme determined in accordance with RSL information indicating the RSL of the received signal; and a complex modulation scheme determination unit which determines the modulation scheme for the transmission source, in accordance with the error-pulse determination information, the CNR determination information, the RSL determination information, and the modulation scheme of the received signal.

11 Claims, 13 Drawing Sheets

COMPLEX CONDITION DETERMINATION UNIT, TRANSMISSION DEVICE, COMPLEX CONDITION DETERMINATION METHOD

CROSS REFERENCE TO RELATED APPLICATIONS

This application is a National Stage of International Application No. PCT/JP2010/072835 filed Dec. 14, 2010, claiming priority based on Japanese Patent Application No. 2009-289089 filed Dec. 21, 2009, the contents of all of which are incorporated herein by reference in their entirety.

TECHNICAL FIELD

The invention relates to a complex condition determination unit, a transmission device, and a complex condition determination method and, particularly a transmission technology using an adaptive modulation scheme.

BACKGROUND ART

The adaptive modulation scheme is good-known as a method for keeping high-speed communication while maintaining communication quality. The adaptive modulation scheme selects an optimum modulation scheme depending on condition of a transmission path. Patent Document 1 describes the technology in which adaptive modulation is conducted by determining line condition using a CNR (Carrier to Noise Ratio, i.e. carrier-wave power to signal power ratio) in a wireless transmission device using the adaptive modulation scheme. Patent Document 1 discloses a communication device which uses the CNR as communication quality information and selects a modulation scheme by comparing the CNR with a determination threshold value.

Patent Document 1 discloses a communication device which estimates speed of change of propagation path condition based on a fading pitch (occurrence cycle of fading) and selects an estimation method of communication quality depending on the result thereof.

The communication device described in Patent Document 1 improves transmission efficiency by selecting a modulation scheme based on communication quality estimated by the selected method.

PRIOR ART DOCUMENT

Patent Document

[Patent Document 1] JP 2005-318533 A (paragraphs [0031], [0036])

SUMMARY OF INVENTION

Technical Problem

In a multi-value modulation scheme, an information volume per 1 symbol is called a modulation multi-value number. In the modulation scheme with a large modulation multi-value number, like 256 QAM (Quadrature Amplitude Modulation), while a transmission capacity is large, reliability is easy to be deteriorated since an error increases susceptibly as the line condition is deteriorated. Therefore, when the line condition is deteriorated, it is necessary to select a modulation scheme which has a smaller modulation multi-value number, like 128 QAM, 64 QAM and is highly resistant to deterioration of the line condition to improve transmission reliability.

However, the communication device described in Patent Document 1 has the problem that determination of switching for a modulation scheme may not follow rapid line deterioration, as will be described in the following.

When the CNR is utilized as line quality information, it is necessary to perform average value calculation and protection processing at the time of CNR calculation in order to keep reliability as quality information. Therefore, a predetermined period of time before outputting of a determination result of switching a modulation scheme is required. For this reason, if the adaptive modulation is conducted using only CNR as line quality information, a modulation scheme cannot be instantly changed into a higher reliable modulation scheme when rapid deterioration of line quality occurs. As a result, in the communication device described in Patent Document 1, with communication being conducted using the modulation scheme with the large modulation multi-value number despite deterioration of line quality, an error may occur in transmission data.

The communication device described in Patent Document 1 estimates a fading pitch from a wireless signal and selects information used in a communication quality estimation unit based on the estimated fading pitch. However, since a predetermined data volume has to be received in order to estimate the fading pitch, switching of a modulation scheme requires a predetermined period of time even if line condition rapidly changes. The communication device described in Patent Document 1, therefore, includes the problem in which determination of a modulation scheme cannot follow rapid line deterioration even though the fading pitch is used for estimation of communication quality.

As described below, determining the line condition using only a CNR, the communication device described in Patent Document 1 may not switch into the modulation scheme having the large modulation multi-value number when a received signal includes distortion.

A relation between transmission power and a signal distortion is described here. Generally, as transmission output increases, waveform distortion occurs in a transmitted signal when outputted power exceeds a certain value.

In a modulation scheme with a small modulation multi-value, like QPSK (Quaternary Phase Shift Keying), a CNR required for a given BER (Bit Error Rate) (required CNR) is small compared with a modulation scheme with a large modulation multi-value. In the modulation scheme like QPSK, therefore, even if some degree of CNR deterioration occurs, line quality remains unaffected. As a result, it is possible to increase a system gain (maximum level difference between a transmitter and a receiver) by increasing the transmission power.

In a modulation scheme with a large modulation multi-value, like 256 QAM, the required CNR for a given BER is relatively large. In the modulation scheme like 256 QAM, an acceptable range of CNR deterioration due to waveform distortion is narrow. In the modulation scheme like 256 QAM, transmission power cannot be increased to or beyond a given value.

When high transmission power is arranged in order to increase a system gain at the time of transmission using a modulation scheme with a small modulation multi-value, a CNR is deteriorated due to waveform distortion during transmission. Therefore, even though line condition is good and CNR deterioration hardly occurs during radio wave propagation, a CNR of a received signal may fall below the required CNR in a modulation scheme with a large modulation multi-value number. In this case, for example, even though a CNR is improved and communication becomes possible by lowering transmission power even using a modulation scheme with a larger modulation multi-value number, it is impossible to switch a modulation scheme into a modulation scheme with a large modulation multi-value number since a CNR of a current received signal is deteriorated. Therefore, when line condition is determined using only a CNR like the communication device described in Patent Document 1, it is impossible to switch a modulation scheme into a modulation scheme with a large modulation multi-value despite good line condition.

An object of the invention is to provide a complex condition determination unit, a transmission device, and a complex condition determination method to make it possible to select a modulation scheme adapted to line condition even if line condition rapidly changes or a CNR is deteriorated due to waveform distortion during transmission.

Solution to Problem

A complex condition determination unit of the invention includes an error-pulse switching determination means for outputting, as error-pulse determination information, information indicating whether an accumulated value of the number of error pulses accumulated over a predetermined period is equal to or greater than a predetermined error-pulse threshold value, the error pulses indicating whether an error exists in a received signal, a CNR modulation scheme determination means for outputting, as CNR determination information, a modulation scheme determined in accordance with a predetermined CNR threshold value and CNR information indicating a CNR of the received signal, an RSL (receive signal level) modulation scheme determination means for outputting, as RSL determination information, a modulation scheme determined in accordance with a predetermined RSL threshold value and RSL information indicating a RSL of the received signal, and a complex modulation scheme determination means for determining the modulation scheme for the transmission source of the received signal, in accordance with the error-pulse determination information, the CNR determination information, the RSL determination information, and received modulation scheme information indicating the modulation scheme of the received signal.

A complex condition determination method of the invention includes determining a modulation scheme, a modulation multi-value number of which is smaller than that of a modulation scheme of a received signal indicated by received modulation scheme information as a modulation scheme for a transmission source of the received signal, when an accumulated value of the number of error pulses accumulated over a predetermined period is equal to or greater than a predetermined error-pulse threshold value, the error pulses indicating whether an error exists in the received signal, determining a modulation scheme indicated by CNR determination information as the modulation scheme for the transmission source of the received signal, when the accumulated value is smaller than the predetermined error-pulse threshold value and a modulation multi-value number of the modulation scheme indicated by the CNR determination information is smaller than a modulation multi-value number of the modulation scheme of the received signal, the CNR determination information being determined based on a CNR of the received signal, and determining a modulation scheme indicated by RSL determination information as the modulation scheme for the transmission source of the received signal, when the accumulated value is smaller than the predetermined error-pulse threshold value, the modulation multi-value number of the modulation scheme indicated by the CNR determination information is equal to or greater than the modulation multi-value number of the modulation scheme of indicated by the received modulation scheme information, and the modulation multi-value number of the modulation scheme indicated by the CNR determination information is smaller than a modulation multi-value number of a modulation scheme indicated by RSL determination information determined based on an RSL of the received signal.

Advantageous Effects of Invention

The invention advantageously makes it possible to select a modulation scheme adapted to line condition even though line condition rapidly changes or a CNR is deteriorated due to waveform distortion during transmission.

DESCRIPTION OF EMBODIMENTS

First Exemplary Embodiment

Figure 1:
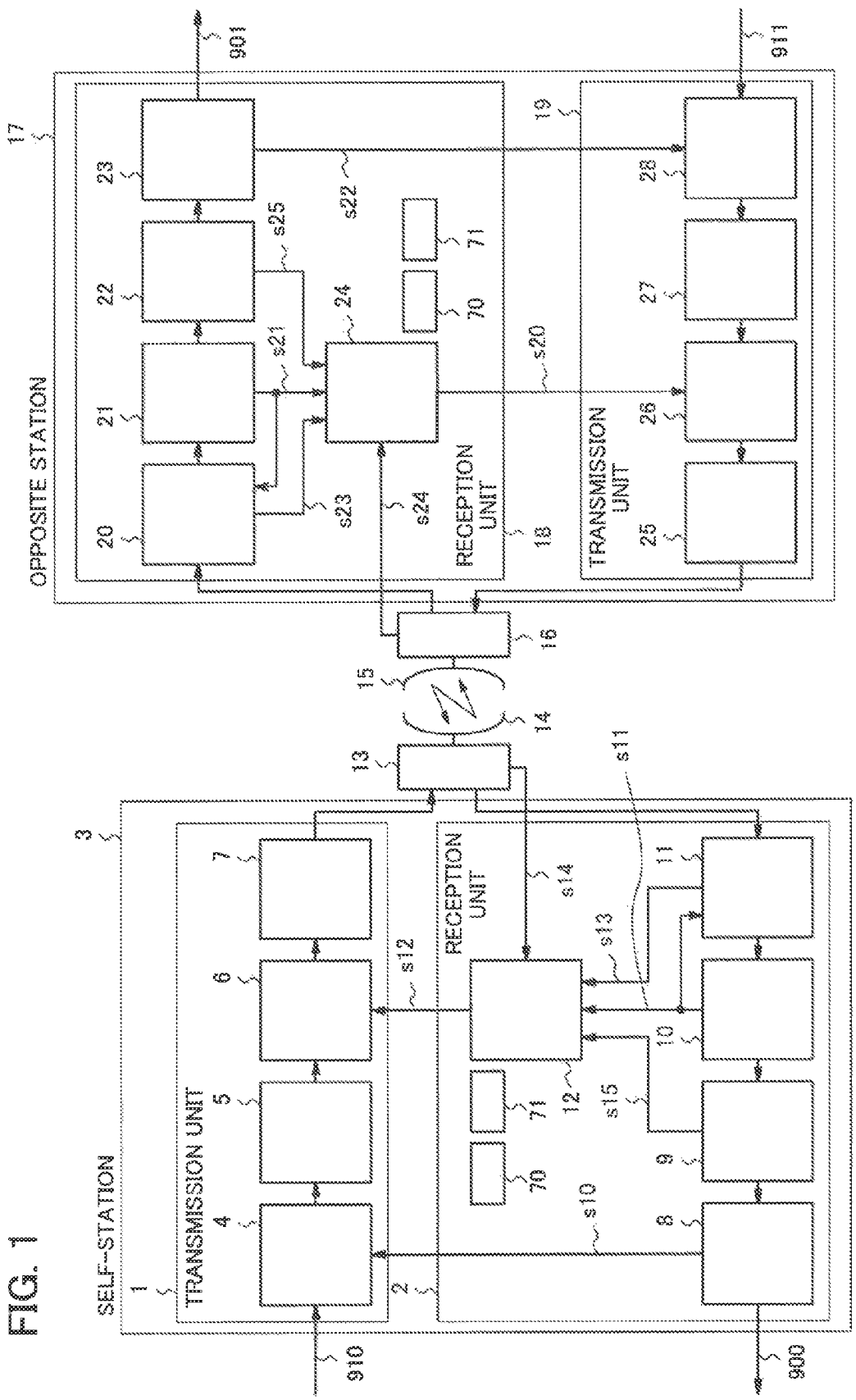
FIG. 1 is a diagram illustrating a configuration of a wireless transmission system of a first exemplary embodiment.

FIG. 1 is a diagram illustrating a configuration of a wireless transmission system of a first exemplary embodiment of the invention. In FIG. 1, a self-station 3 and an opposite station 17 are transmission devices using a radio wave and perform wireless communication each other. In FIG. 1, a configuration of the self-station 3 is the same as that of the opposite station 17. Therefore, the configuration of the self-station 3 is mainly described below.

The self-station 3 includes a transmission unit 1 and a reception unit 2. A RF (Radio Frequency) unit 13 frequency-converts a signal outputted from the transmission unit 1, amplifies the signal, and outputs it to an antenna 14.

The antenna 14 radiates the signal inputted from the RF unit 13 as a radio wave. An antenna 15 of the opposite station 17 receives the radio wave radiated by the antenna 14. The antenna 14 receives a radio wave radiated from the antenna 15 of the opposite station 17. The antenna 14 outputs the received radio wave to the RF unit 13. The RF unit 13 amplifies and frequency-converts the signal inputted from the antenna 14 and outputs it to the reception unit 2 of the self-station 3.

Figure 6:
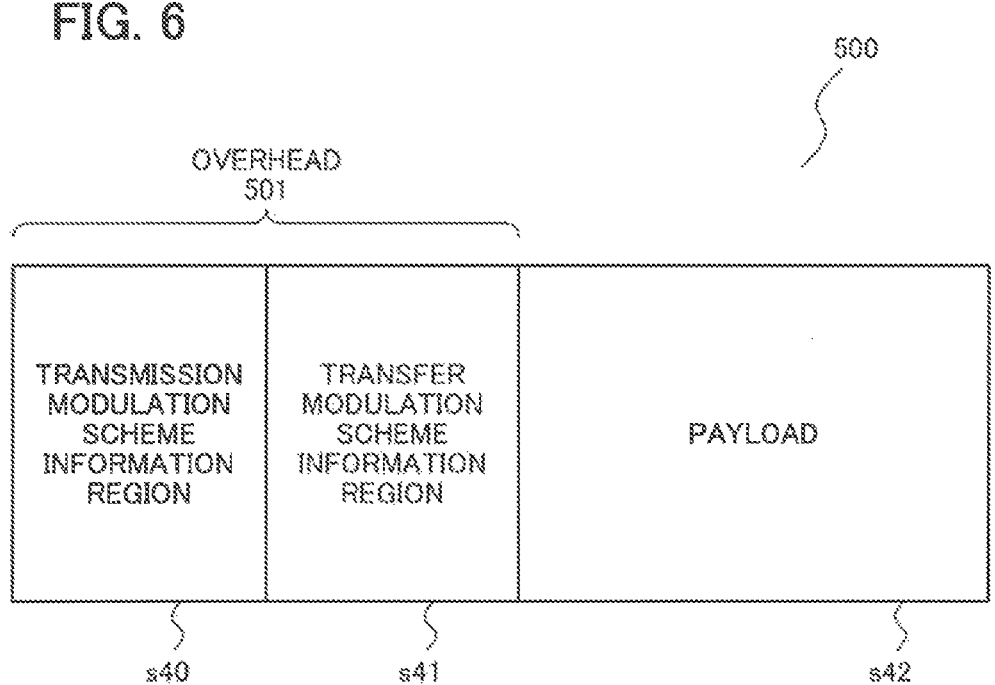
FIG. 6 is a diagram illustrating an example of a wireless frame format.

FIG. 6 shows an example of a wireless frame format. The self-station 3 and the opposite station 17 perform communication by continuously transmitting and receiving a wireless frame 500. The wireless frame 500 includes an overhead 501 and a payload s42. The overhead 501 includes a transmission modulation scheme information region s40 and a transfer modulation scheme information region s41.

A transmission data multiplex unit 4 multiplexes the payload s42 of the wireless frame 500 with data inputted from the outside. At this time, transmission modulation scheme information s10 inputted from a reception data extraction unit 8 is multiplexed into the transmission modulation scheme information region s40 of the wireless frame overhead 501.

An error correction encode unit 5 encodes data of the wireless frame 500 inputted from the transmission data multiplex unit 4 for error correction and outputs it to a modulation scheme information multiplex unit 6. The modulation scheme information multiplex unit 6 multiplexes the transfer modulation scheme information region s41 of the wireless frame overhead 501 with determination modulation scheme information s12 inputted from a complex condition determination unit 12. A modulation unit 7 modulates the wireless frame 500 inputted from the modulation scheme information multiplex unit 6 with a predetermined modulation scheme, and outputs it to the RF unit 13.

The RF unit 13 generates RSL (Received Signal Level) information s14 and outputs it. The RSL information s14 is information on a level of the received signal. A demodulation unit 11 demodulates the received signal from the opposite station 17, which is outputted by the RF unit 13, and outputs the demodulated signal to a modulation scheme information extraction unit 10. The demodulation unit 11 generates CNR information s13 from the received signal and outputs it. The RSL information s14 and the CNR information s13 are inputted to the complex condition determination unit 12.

The modulation scheme information extraction unit 10 extracts received modulation scheme information s11 from the transmission modulation scheme information region s40 of the inputted wireless frame overhead 501 after demodulation and outputs it to the complex condition determination unit 12 and the demodulation unit 11.

An error correction decode unit 9 decode the wireless frame 500 for error correction and outputs an error pulse s15 to the complex condition determination unit 12. The error correction decode unit 9 generates the error pulse s15 based on errors included in the wireless frame 500. For example, the error correction decode unit 9 may determine whether or not an error exists in a block unit of the wireless frame 500 and generate the error pulse s15. The error correction decode unit 9 may generate the error pulse s15 using any processing which is outputted in response to error occurrence.

The complex condition determination unit 12 determines a modulation scheme based on the CNR information s13, the RSL information s14, the error pulse s15, and the received modulation scheme information s11 which are inputted, and outputs the result to the modulation scheme information multiplex unit 6 as the determination modulation scheme information s12.

The reception data extraction unit 8 extracts output data 900 from the wireless frame 500 after error correction and outputs it to the outside. The reception data extraction unit 8 extracts the transmission modulation scheme information s10 from the transfer modulation scheme information region s41 of the wireless frame overhead 501 and outputs it to the transmission data multiplex unit 4 of the transmission unit 1 as the transmission modulation scheme information s10.

Figure 2:
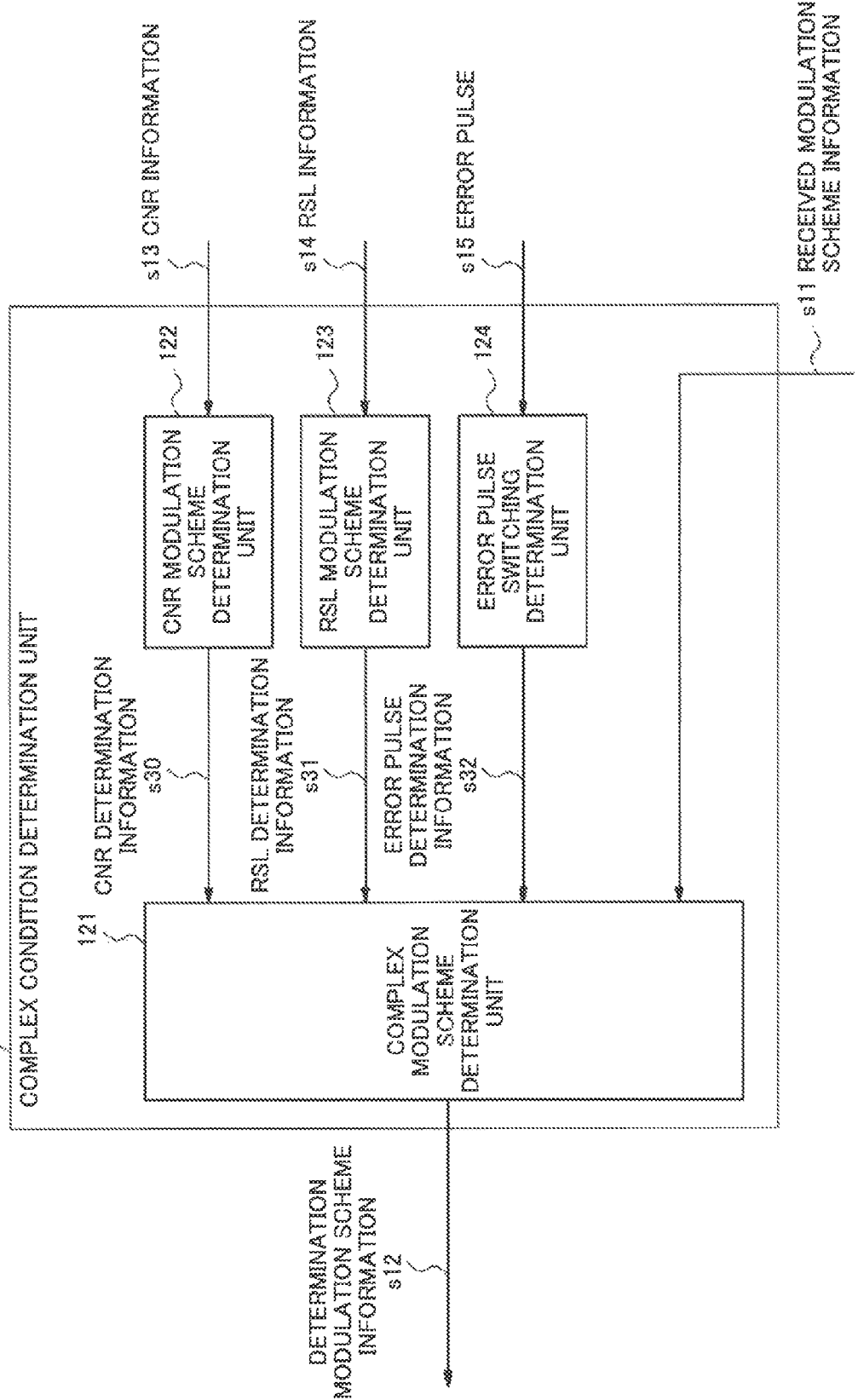
FIG. 2 is a diagram illustrating a configuration of a complex condition determination unit.

FIG. 2 is a diagram illustrating a configuration of the complex condition determination unit 12. The complex condition determination unit 12 includes a complex modulation scheme determination unit 121, a CNR modulation scheme determination unit 122, a RSL modulation scheme determination unit 123, and an error pulse switching determination unit 124.

The CNR modulation scheme determination unit 122 outputs a modulation scheme which is modulated with transmission data, the modulation scheme being determined based on the CNR information s13, as CNR determination information s30.

The RSL modulation scheme determination unit 123 outputs a modulation scheme which is multiplexed with transmission data, the modulation scheme being determined based on the RSL information s14, as RSL determination information s31.

As described below, the complex modulation scheme determination unit 121 determines a modulation scheme which is actually multiplexed with transmission data in the modulation scheme information multiplex unit 6, based on the CNR determination information s30, the RSL determination information s31, error pulse determination information s32, and the received modulation scheme information s11.

The error pulse switching determination unit 124 outputs information on whether or not the number of occurrences of the error pulse is equal to or greater than a predetermined threshold value as the error pulse determination information s32 based on the number of occurrences of the error pulse s15 per unit time.

The complex modulation scheme determination unit 121 determines a modulation scheme which is next applied in a line received in the self-station 3 based on the CNR determination information s30, the RSL determination information s31, error pulse determination information s32, and the received modulation scheme information s11, and outputs it as the determination modulation scheme information s12.

Figure 3:
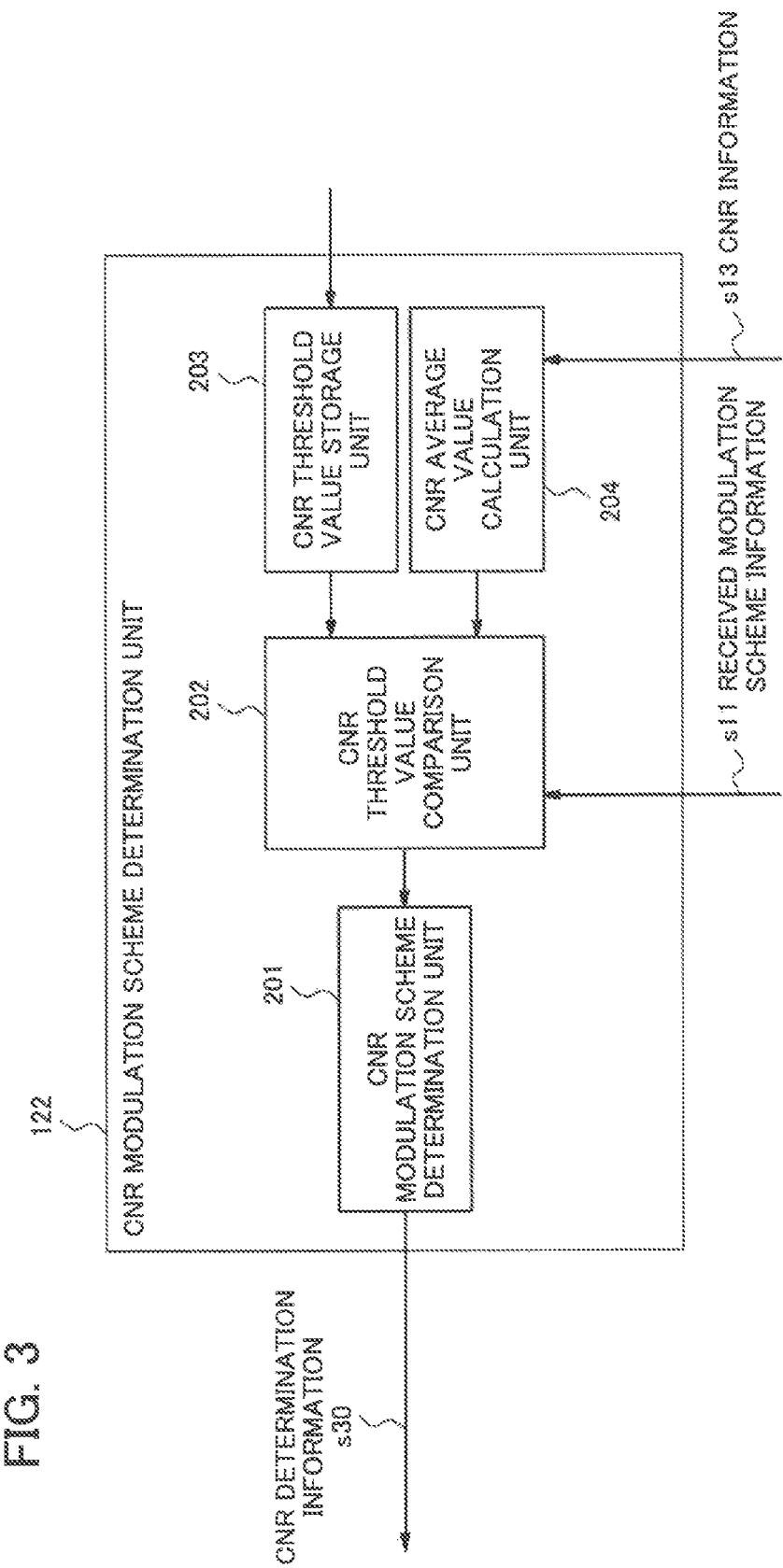
FIG. 3 is a diagram illustrating a configuration of a CNR modulation scheme determination unit.

FIG. 3 is a diagram illustrating a configuration of the CNR modulation scheme determination unit 122. The CNR modulation scheme determination unit 122 includes a CNR modulation scheme determination unit 201, a CNR threshold value comparison unit 202, a CNR threshold value storage unit 203, and a CNR average value calculation unit 204.

The CNR average value calculation unit 204 samples an average value of the inputted CNR information s13 for a given period of time, calculates the average value thereof, and outputs it to the CNR threshold value comparison unit 202.

The CNR threshold value storage unit 203 holds, in a table therein, information indicating the minimum CNR which is allowable in each modulation scheme as a CNR threshold value. The CNR threshold value storage unit 203 outputs the CNR threshold value to the CNR threshold value comparison unit 202. Here, information on a correspondence relation between each modulation scheme and the CNR threshold value stored in the CNR threshold value storage unit 203 may be fixedly written in memory arranged in the CNR threshold value storage unit 203 or may be written in the CNR threshold value storage unit 203 from the outside of the self-station 3.

The CNR threshold value comparison unit 202 determines a modulation scheme in which an average value of a CNR of the received signal is equal to or greater than a CNR threshold value of a modulation scheme of a determination result based on the CNR threshold value which is inputted from a CNR threshold value storage unit 203 and corresponds to each modulation scheme and based on an average value of a CNR inputted from the CNR average value calculation unit 204, and outputs the determination result to the CNR modulation scheme determination unit 201.

The CNR modulation scheme determination unit 201 has a determination protection function, monitors the modulation scheme determined in the CNR threshold value comparison unit 202, and ensures the determination of the modulation scheme if the same modulation scheme is continuously inputted by a predetermined number of protections. The CNR modulation scheme determination unit 201 outputs the ensured modulation scheme as the CNR determination information s30. That is, when the same modulation scheme is continuously inputted from the CNR threshold value comparison unit 202 by a predetermined number of times, the CNR modulation scheme determination unit 201 outputs the modulation scheme as the CNR determination information s30.

Figure 4:
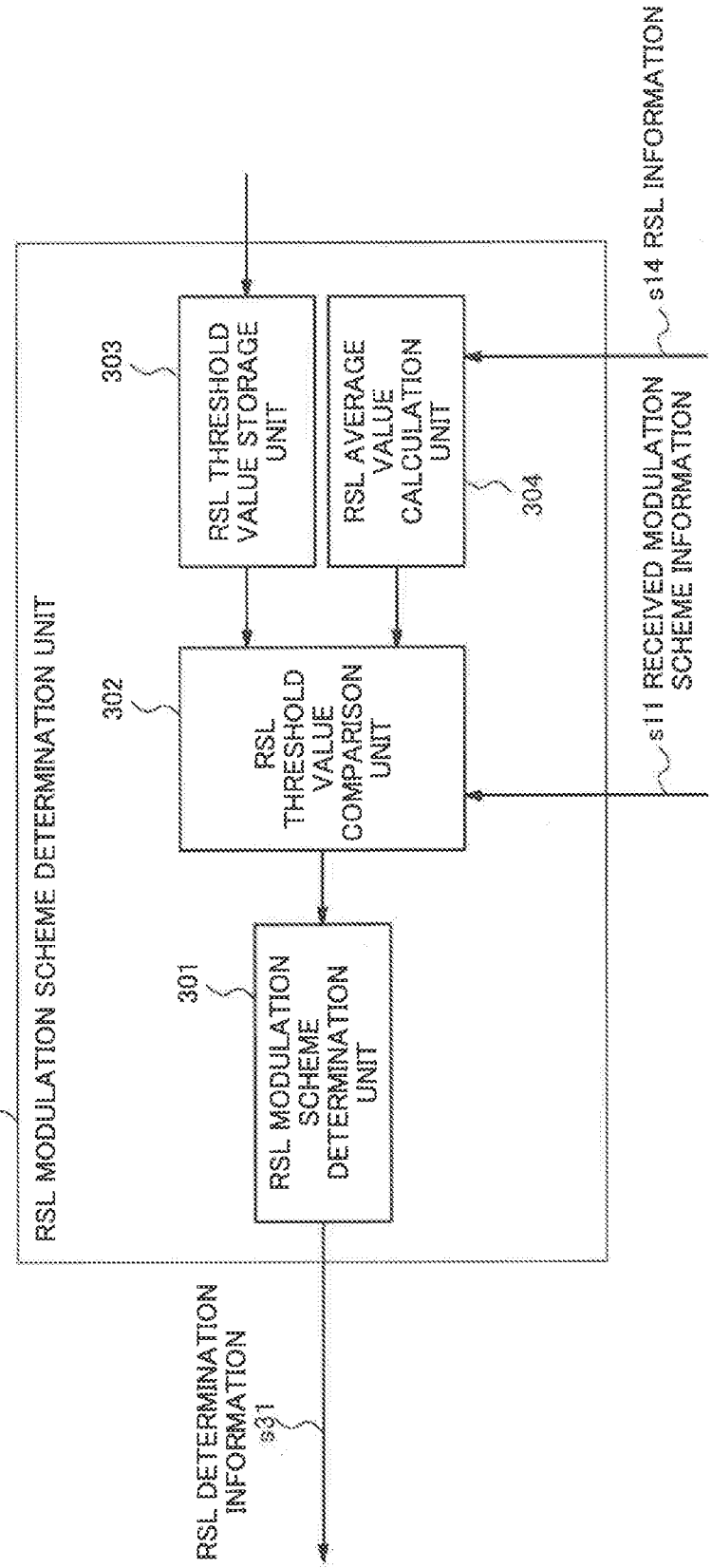
FIG. 4 is a diagram illustrating a configuration of a RSL modulation scheme determination unit.

FIG. 4 is a diagram illustrating a configuration of the RSL modulation scheme determination unit 123. The RSL modulation scheme determination unit 123 includes a RSL modulation scheme determination unit 301, a RSL threshold value comparison unit 302, a RSL threshold value storage unit 303, and a RSL average value calculation unit 304, like the CNR modulation scheme determination unit 122. The RSL average value calculation unit 304 calculates an average value of the RSL information s14 at a constant period and outputs it to the RSL threshold value comparison unit 302.

The RSL threshold value storage unit 303 holds information indicating the minimum RSL which is allowable in each modulation scheme as a RSL threshold value in a table therein. The RSL threshold value storage unit 303 stores a correspondence relation between each modulation scheme and the RSL threshold value and outputs it to the RSL threshold value comparison unit 302. Information on the correspondence relation between each modulation scheme and the RSL threshold value stored in the RSL threshold value storage unit 303 may be fixedly written in memory arranged in the RSL threshold value storage unit 303 or may be written in the RSL threshold value storage unit 303 from the outside of the self-station 3.

The RSL threshold value comparison unit 302 determines a modulation scheme in which an average value of a RSL of the received signal is equal to or greater than the RSL threshold value based on the RSL threshold value which corresponds to each modulation scheme inputted from the RSL threshold value storage unit 303, an average value of RSL information s14 inputted from the RSL average value calculation unit 304, and the received modulation scheme information s11, and outputs it to the RSL modulation scheme determination unit 301.

When the same modulation multi-value number is continuously inputted from the RSL threshold value comparison unit 302 by a predetermined number of times, the RSL modulation scheme determination unit 301 outputs the modulation scheme as the RSL determination information s31.

Figure 5:
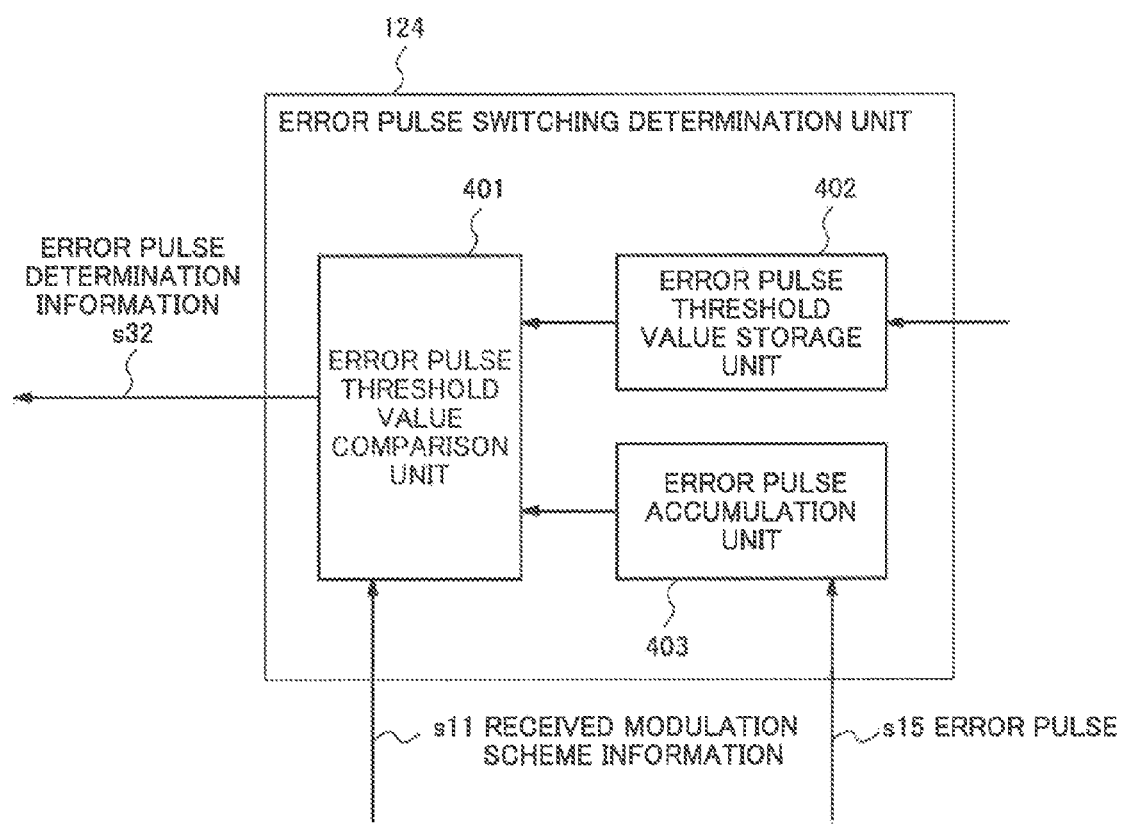
FIG. 5 is a diagram illustrating a configuration of an error-pulse switching determination unit.

FIG. 5 is a diagram illustrating a configuration of the error pulse switching determination unit 124. The error pulse switching determination unit 124 includes an error pulse threshold value comparison unit 401, an error pulse threshold value storage unit 402, and an error pulse accumulation unit 403.

The error pulse accumulation unit 403 accumulates the number of error pulses s15 inputted for a given period of time, and outputs the accumulated value to the error pulse threshold value comparison unit 401. When the accumulation period for error pulses elapses, the error pulse accumulation unit 403 resets the accumulated value and starts accumulation again.

The error pulse threshold value storage unit 402 stores an error pulse threshold value corresponding to a modulation scheme and outputs it to the error pulse threshold value comparison unit 401.

Information on a correspondence relation between each modulation scheme and the error pulse threshold value stored in the error pulse threshold value storage unit 402 may be fixedly written in memory arranged in the error pulse threshold value storage unit 402 or may be written in the error pulse threshold value storage unit 402 from the outside of the self-station 3.

The error pulse threshold value comparison unit 401 outputs the error pulse determination information s32 based on a threshold value inputted from the error pulse threshold value storage unit 402 and an accumulated value of an error pulse inputted from the error pulse accumulation unit 403. The error pulse determination information s32 represents whether or not the number of occurrences of an error pulse per unit time is equal to or greater than the threshold value.

In the wireless frame 500 shown in FIG. 6, the transmission data multiplex unit 4 multiplexes the transmission modulation scheme information region s40 with the transmission modulation scheme information s10. The transmission modulation scheme information s10 represents the modulation scheme of the wireless frame which is transmitted following the frame multiplexed with the information. The modulation unit 7 extracts the transmission modulation scheme information s10 from the transmission modulation scheme information region s40, determines the modulation scheme of the wireless frame to be next inputted using the extracted transmission modulation scheme information s10, and switches the modulation scheme. The above operations are also performed in the opposite station 17.

The transfer modulation scheme information region s41 stores the determination modulation scheme information s12. The determination modulation scheme information s12 is the modulation scheme which is determined in the complex condition determination unit 12 of the self-station 3. The determination modulation scheme information s12 is transferred to the reception unit 18 of the opposite station 17. The reception data extraction unit 23 in the opposite station 17 extracts the determination modulation scheme information s12 from the transfer modulation scheme information region s41 as transmission modulation scheme information s22. A transmission data multiplex unit 28 multiplexes the transmission modulation scheme information region s40 and the payload s42 in the wireless frame with input data 911 and the transmission modulation scheme information s22, respectively.

The self-station 3 includes a CPU (Central Processing Unit) 70 and memory 71. The CPU 70 is a computer which controls each unit of the self-station 3. The memory 71 is a storage device, like semiconductor memory. The CPU 70 controls each unit on the self-station 3 based on a program stored in the memory 71.

Next, operations of the first exemplary embodiment are described. In FIG. 1, since a configuration and operations of the self-station 3 are the same as those of the opposite station 17, operations in data transmission from the self-station 3 to the opposite station 17 is described below.

The transmission data multiplex unit 4 of the self-station 3 multiplexes the payload s42 of the wireless frame with the input data 910 inputted from an outer interface. The transmission data multiplex unit 4 multiplexes the transmission modulation scheme information s10 inputted from the reception data extraction unit 8 with the transmission modulation scheme information region s40 of the overhead 501.

After that, the wireless frame 500 is encoded by the error correction encode unit 5. In the modulation scheme information multiplex unit 6, the transfer modulation scheme information region s41 of the overhead 501 is multiplexed with the determination modulation scheme information s12 inputted from the complex condition determination unit 12 of the self-station 3.

Figure 11:
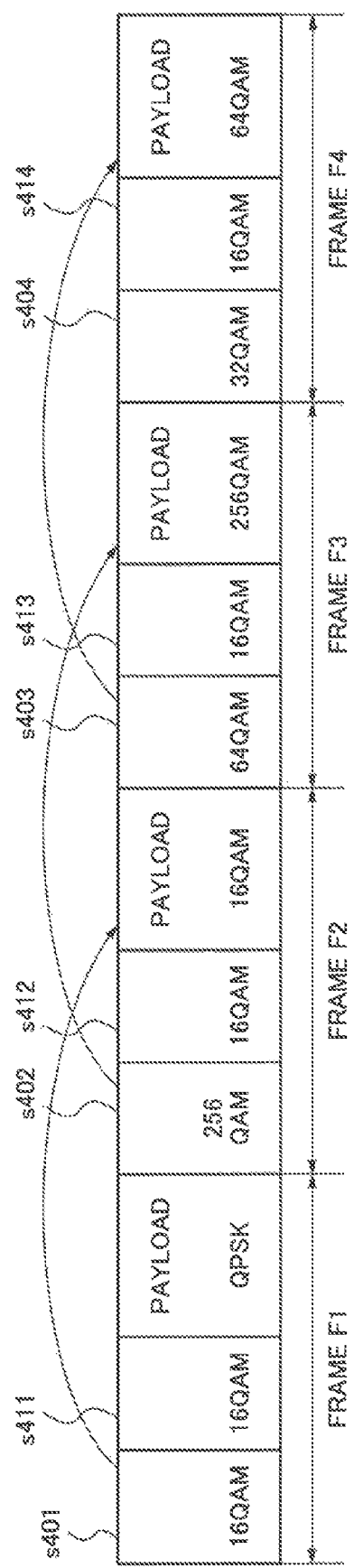
FIG. 11 is a diagram explaining a designation method of a modulation scheme of a wireless frame inputted to a modulation unit.

The modulation scheme of the wireless frame 500 transmitted by the self-station 3 is designated by the transmission modulation scheme information s10 extracted from the wireless frame 500 right in front thereof. A modulation scheme which is applied to a frame inputted in the modulation unit 7 is described with reference to FIG. 11. FIG. 11 is a diagram explaining a designation method of a modulation scheme for a wireless frame inputted in the modulation unit. In FIG. 11, wireless frames are inputted in the modulation unit 7 in order of a frame F1, a frame F2, . . . . Each of configurations of the frames F1, F2 . . . is the same as that of the wireless frame 500 shown in FIG. 6. That is, the overhead 501 of the frame F1 includes a transmission modulation scheme information region s401 and a transfer modulation scheme information region s411. The overhead 501 of the frame F2 includes a transmission modulation scheme information region s402 and a transfer modulation scheme information region s412. A frame F3 and frames after the frame F3 include the same.

In FIG. 11, the transmission modulation scheme information region s401 of the frame F1 designates 16 QAM as the transmission modulation scheme information s10. The transmission modulation scheme information region s402 of the frame F2 designates 256 QAM as the transmission modulation scheme information.

Receiving the frame F1, the modulation unit 7 reads the transmission modulation scheme information s10 (16 QAM) included in the transmission modulation scheme information region s401 from the overhead 501 of the frame F1. The modulation unit 7 stores the read transmission modulation scheme information s10 (16 QAM) in the modulation unit 7.

The modulation unit 7 reads the read transmission modulation scheme information s10 (QPSK) which is read from the frame (not shown) right in front of the frame F1 and stored. By using the modulation scheme (QPSK) designated by the transmission modulation scheme information s10 read from the frame right in front thereof, the frame F1 is modulated and outputted to the RF unit 13.

Receiving the frame F2, the modulation unit 7 reads the transmission modulation scheme information s10 (256 QAM) included in the transmission modulation scheme information region s402. The modulation unit 7 stores the transmission modulation scheme information s10 (256 QAM) read from the frame F2 in the modulation unit 7.

The modulation unit 7 modulates the frame F2 by using the modulation scheme designated by the transmission modulation scheme information s10 (16 QAM) read from the frame F1 and stored, and outputs it to the RF unit 13.

The transmission modulation scheme information s10 (256 QAM) read from the frame F2 represents the modulation scheme of the payload s42 in the frame F3. The modulation unit 7 modulates the frame F3 using 256 QAM.

As described above, the modulation unit 7 modulates the following wireless frame 500 in accordance with the modulation scheme of designated by the transmission modulation scheme information included in the wireless frame inputted at the last minute. The modulation unit 7 extracts the transmission modulation scheme information s10 from the inputted wireless frame 500 and stores it as the modulation scheme for the next frame. The modulation unit 7 outputs the wireless frame modulated by using the arranged modulation scheme to the RF unit 13.

The RF unit 13 frequency-converts and amplifies the signal outputted from the modulation unit 7 and outputs it to the antenna 14. The antenna 14 radiates the signal inputted from the RF unit 13 as a radio wave.

Next, operations of the opposite station 17 are described.

A RF unit 16 of the opposite station 17 frequency-converts and amplifies a received signal inputted from an antenna 15 and outputs the amplified signal to a demodulation unit 20. The RF unit 16 generates RSL information s24 from the received signal and outputs it to a complex condition determination unit 24.

The demodulation unit 20 demodulates a wireless signal transmitted by the transmission unit 1 of the self-station 3 based on received modulation scheme information s21 inputted from a modulation scheme information extraction unit 21. As explained in FIG. 11, the transmission modulation scheme information s10 included in the transmission modulation scheme information region s401 represents a modulation scheme which is applied to the next wireless frame F2. The transmission modulation scheme information s10 included in the transmission modulation scheme information region s401 is extracted in the modulation scheme information extraction unit 21 of the opposite station 17 as the received modulation scheme information s21 and outputted to the demodulation unit 20 and the complex condition determination unit 24. The demodulation unit 20 demodulates a frame next inputted by using the modulation scheme designated by the received modulation scheme information s21 extracted from the frame right in front thereof.

The demodulation unit 20 calculates a CNR which is line quality information from the received signal, and outputs it to the complex condition determination unit 24.

An error correction decode unit 22 performs decode processing on the received wireless signal 500. If an error is detected in data, the error correction decode unit 22 corrects a correctable error and generates an error pulse s25. The error correction decode unit 22 outputs the error pulse s25 to the complex condition determination unit 24.

The reception data extraction unit 23 extracts output data 901 from the payload s42 of the wireless frame 500 and outputs it to an outer interface. The reception data extraction unit 23 extracts contents of the transfer modulation scheme information region s41 from the overhead 501 and outputs them to the transmission data multiplex unit 28 as the transmission modulation scheme information s22 which determines the modulation scheme of the transmission unit 19.

A modulation unit 25 switches a modulation scheme of transmission in a direction from the opposite station 17 to the self-station 3 based on the transmission modulation scheme information s22. Switching steps of the modulation scheme is similar to the switching steps of the modulation scheme in the modulation unit 7 of the self-station 3. Descriptions thereof are therefore omitted.

Here, the transmission modulation scheme information s22 extracted by the reception data extraction unit 23 is the determination modulation scheme information s12 which the self-station 3 generates in the complex condition determination unit 12. Therefore, a wireless frame transmitted from the opposite station 17 to the self-station 3 is modulated using the modulation scheme represented by the determination modulation scheme information s12.

The opposite station 17 is a transmission source of the wireless frame received by the self-station 3. The complex condition determination unit 12 of the self-station 3 determines the modulation scheme which is used for modulation of the wireless frame which the transmission source of the received signal received by the self-station 3 transmits to the self-station 3. The complex condition determination unit 12 outputs the determination result on the modulation scheme as the determination modulation scheme information s12.

Next, processing of the complex condition determination unit 12 is described. As shown in FIG. 2, the complex modulation scheme determination unit 121 generates the determination modulation scheme information s12 from each of outputs of the CNR modulation scheme determination unit 122, the RSL modulation scheme determination unit 123, and the error pulse switching determination unit 124 which operate in parallel.

Figure 7:
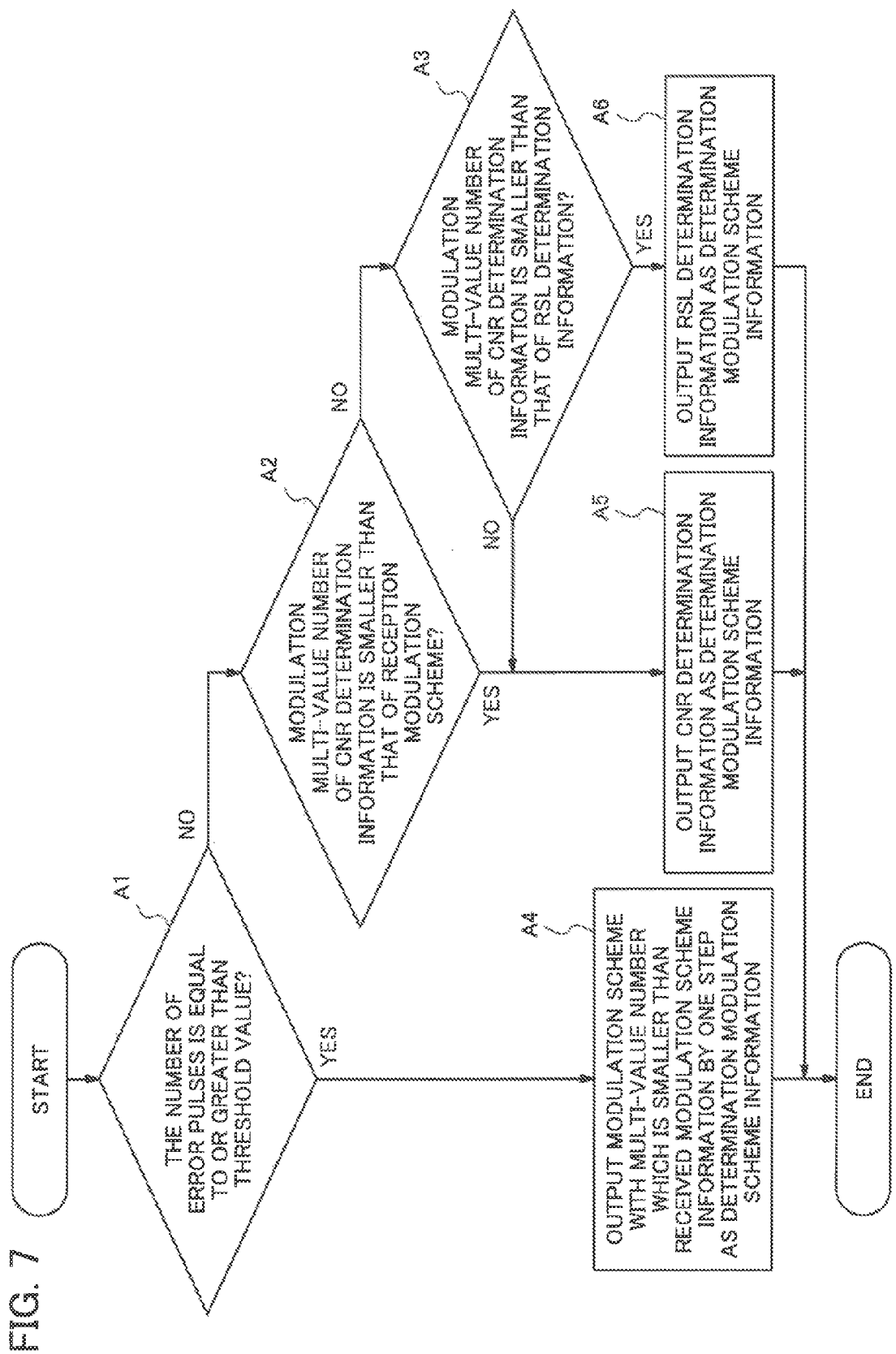
FIG. 7 is a flowchart illustrating an operation of a complex modulation scheme determination unit.

FIG. 7 is a flowchart illustrating operations of the complex modulation scheme determination unit 121.

The complex modulation scheme determination unit 121 gives priority to processing for determining a modulation scheme so that a modulation multi-value number is reduced when a propagation environment is deteriorated in order to ensure line reliability. When the propagation environment is not deteriorated, determination to increase the modulation multi-value number of the modulation scheme is performed.

In FIG. 7, the complex modulation scheme determination unit 121 determines whether or not the modulation multi-value number has to be reduced in steps A1 and A2. When it is not necessary to reduce the modulation multi-value number, step A3 is performed. In step A3, the modulation multi-value number indicated by the CNR determination information s30 is compared with that indicated by the RSL determination information s31 and the modulation scheme with the larger modulation multi-value number is outputted as the determination modulation scheme information s12.

Each of the steps is described below. The steps may be performed when a CPU 70 controls the complex condition determination unit 12 based on a program stored in memory 71.

The complex modulation scheme determination unit 121 monitors whether or not the number of error pulses is equal to or greater than the threshold value based on the error pulse determination information s32 (step A1). When the error pulse determination information s32 represents the determination that the number of error pulses is equal to or greater than the threshold value (step A1: Yes), the complex modulation scheme determination unit 121 operates as follows. That is, the complex modulation scheme determination unit 121 outputs the modulation scheme with the modulation multi-value number which is smaller than the received modulation scheme information s11 by one step in priority to the CNR determination information s30 and the RSL determination information s31, as the determination modulation scheme information s12 (step A4). For example, if an error pulse exceeds the threshold value when the modulation scheme represented by the received modulation scheme information s11 is 128 QAM, the complex modulation scheme determination unit 121 outputs 64 QAM as the determination modulation scheme information s12. Here, the complex modulation scheme determination unit 121 may output 32 QAM or 16 QAM which is the modulation scheme with the modulation multi-value number which is, by two steps or more than two steps, smaller than that of the modulation scheme represented by the received modulation scheme information s11 as the determination modulation scheme information s12.

The error pulse s15 directly indicates that an error occurs in a wireless frame inputted into the error correction decode unit 9. It is possible to detect fading which is difficult to be determined by a CNR or a RSL and to instantly detect rapid line deterioration, by monitoring the error pulse s15. By using the error pulse s15, it is possible to determine necessity of modulation scheme switching due to deterioration of radio wave propagation environment in a short time and with high reliability, compared with the CNR information s13 and the RSL information s14.

When the number of the error pulses s15 is smaller than the threshold value and the error pulse determination information s32 represents determination that the number of error pulses is smaller than the threshold value (step A1: No), the modulation multi-value number of the modulation scheme indicated by the received modulation scheme information s11 and that indicated by the CNR determination information s30 are compared with each other (step A2). In step A2, when the modulation multi-value number indicated by the CNR determination information s30 is smaller than the modulation multi-value number indicated by the received modulation scheme information s11 (step A2: Yes), the CNR determination information s30 is outputted as the determination modulation scheme information s12 (step A5).

In steps A1 and A2, when the determination condition that the modulation multi-value number is made smaller than the received modulation scheme information s11 is not satisfied (step A2: No), determination is performed so as to increase the modulation multi-value number based on the CNR determination information s30 and the RSL determination information s31 (step A3). That is, in step A3, the modulation multi-value number of the CNR determination information s30 and that of the RSL determination information s31 are compared with each other and the modulation scheme with the greater modulation multi-value number is selected as the determination modulation scheme information s12 (steps A5, A6).

In procedures of steps A3, A6, and A5, when the modulation multi-value number of the modulation scheme indicated by the RSL determination information s31 is greater than the modulation multi-value number of the modulation scheme indicated by the CNR determination information s30, it becomes possible to switch into the modulation scheme with the greater modulation multi-value number. Even though switching condition is not satisfied due to CNR deterioration when transmission power of the received signal is increased, it becomes possible to switch into the modulation scheme with the greater modulation multi-value number by using the procedures above.

Figure 8:
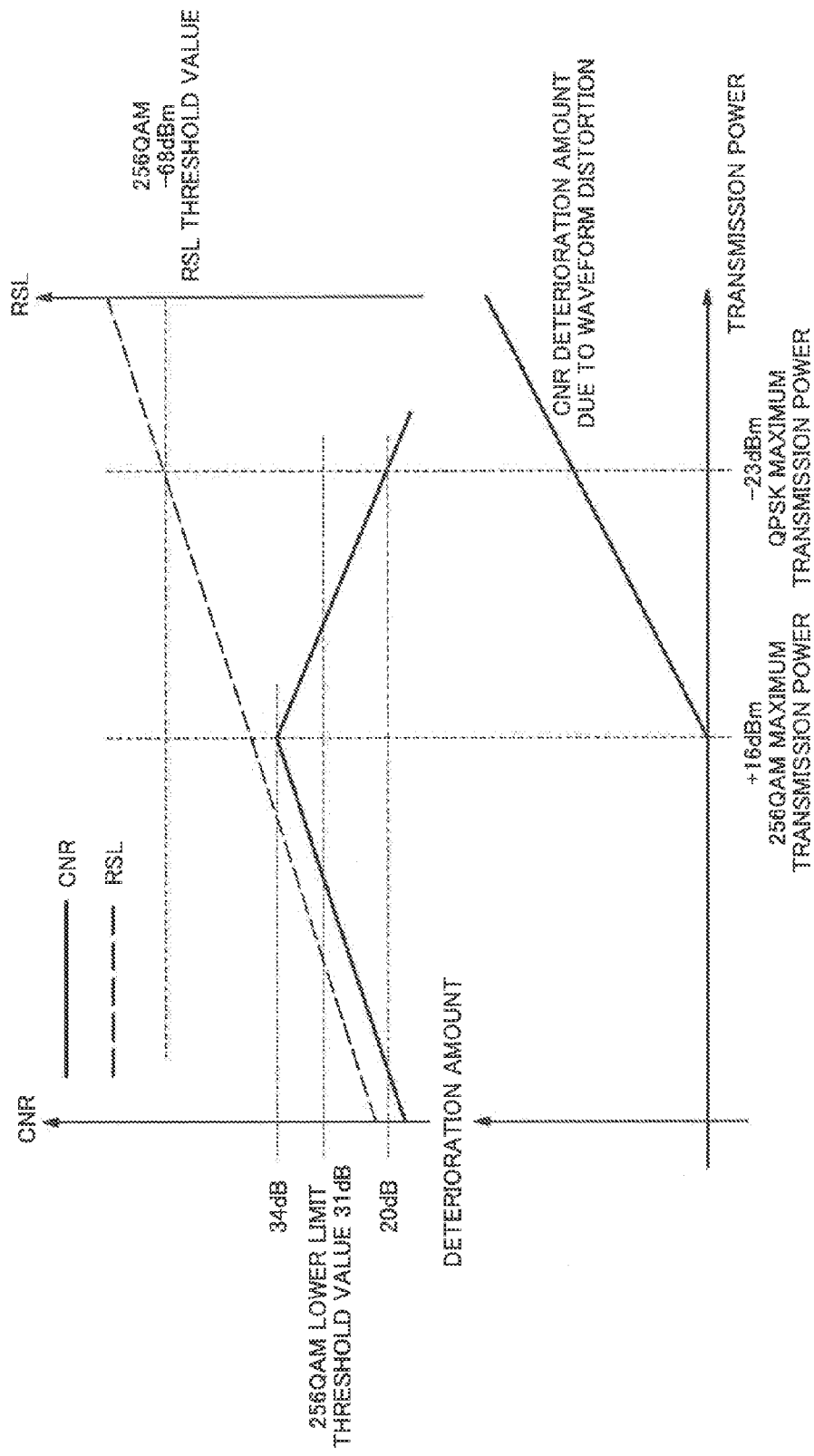
FIG. 8 is a diagram illustrating a relation of CNR to transmission power, and a relation of CNR deterioration amount due to waveform distortion to transmission power.

In step A3 in FIG. 7, the determination modulation scheme information s12 is determined using the CNR determination information s30 and the RSL determination information s31. The step A3 is specifically described using FIG. 8. FIG. 8 is a diagram illustrating a relation of a CNR to transmission power, and a relation of a CNR deterioration amount due to waveform distortion to transmission power. A case, in which modulation scheme switching from QPSK to 256 QAM occurs in transmission from the opposite station 17 to the self-station 3, is described here.

Suppose that a modulation scheme of a wireless frame which is transmitted from the transmission unit 19 of the opposite station 17 to the reception unit 2 of the self-station 3 is QPSK. A maximum transmission power of a transmission wave is set at +23 dBm which is higher than transmission power of +16 dBm at which distortion occurs, in order to improve a system gain. For this reason, distortion occurs in the transmission wave outputted from the antenna 15 and a CNR obtained in the demodulation unit 11 of the self-station 3 is deteriorated despite wireless line condition. In this case, even if good wireless line condition is kept to be at a level transmittable with 256 QAM, a CNR inputted to the complex condition determination unit 12 falls to 20 dB which is lower than 31 dB which is a switching threshold value from QPSK to 256 QAM. As a result, the CNR modulation scheme determination unit 122 outputs QPSK as the CNR determination information s30. The CNR determination information s30 in step A3 is, therefore, QPSK.

The RSL modulation scheme determination unit 123 determines that when a RSL exceeds −68 dBm which is the switching threshold value to 256 QAM, the line condition is good enough to apply 256 QAM. As a result, the RSL modulation scheme determination unit 123 outputs 256 QAM as the RSL determination information s31. In step A3, the RSL determination information s31 is, therefore, 256 QAM.

Accordingly, the CNR determination information s30 is QPSK, and the RSL determination information s31 is 256 QAM. In step A3, the complex modulation scheme determination unit 121 outputs the RSL determination information s31 (256 QAM) with a greater modulation multi-value number as the determination modulation scheme information s12.

The determination modulation scheme information s12 is transferred to the transmission unit 19 of the opposite station 17 using the procedures described above. As a result, the modulation scheme of the wireless frame transmitted from the transmission unit 19 of the opposite station 17 to the reception unit 2 of the self-station 3 is converted to 256 QAM.

As soon as the modulation scheme is converted to 256 QAM, the RF unit 16 converts transmission power to +16 dBm which is the maximum transmission power of 256 QAM concurrently. Since waveform distortion is reduced by controlling the transmission power of the RF unit 16, the CNR (34 dB) which is sufficient for transmission with 256 QAM is obtained As described above, the wireless transmission system of the first exemplary embodiment compares the CNR determination information s30 with the RSL determination information s31, and chooses the modulation scheme with a greater modulation multi-value number. As a result, even though a CNR is deteriorated due to waveform distortion when transmission power is increased in order to improve a system gain, the system gain can be improved while streamlining line utilization by the adaptive modulation scheme.

An error pulse directly reflects presence of an error in a wireless frame. When rapid line deterioration occurs, a modulation scheme can be switched in a short time and reliability can be improved based on the error pulse determination described in steps A1 and A4, rather than determination using a CNR and a RSL.

In descriptions on FIG. 5, the error pulse switching determination unit 124 outputs whether or not the number of occurrences of error pulses per unit time is equal to or greater than the threshold value, as the error pulse determination information s32. However, the error pulse switching determination unit 124 may calculate an error rate from the number of error pulses per unit time and may output whether or not the error rate is equal to or greater than a predetermined threshold value, as the error pulse determination information s32. The error rate is used as an index of line quality which does not depend on a modulation scheme.

Figure 9:
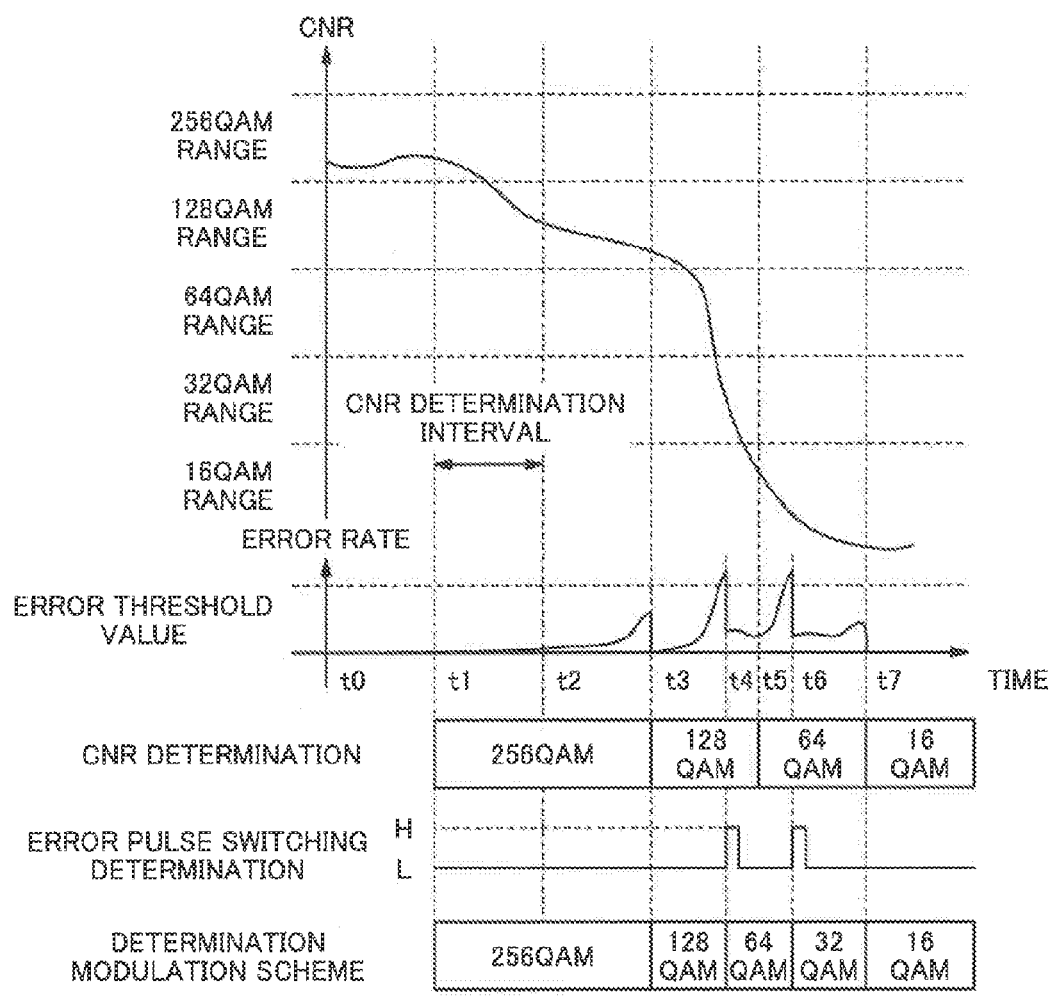
FIG. 9 is a diagram explaining an error rate and a CNR obtained from an error pulse, and modulation scheme determination based on these.

FIG. 9 is a diagram explaining an error rate and a CNR obtained from error pulses, and modulation scheme determination based thereon. The CNR determination information s30 is a value which is obtained by performing an average value operation and protection processing on a CNR value of a pre-interval section. For example, a modulation scheme 128 QAM determined at the time t3 in FIG. 9 is a value which is obtained from a CNR average value between the time t2 and the time t3. When an error rate calculated from the inputted error pulse s15 exceeds the error threshold value (time t4 and time t6), the error pulse switching determination unit 124 outputs a "High" pulse as the error pulse determination information s32. In this example, the error pulse determination information s32 outputted by the error pulse switching determination unit 124 is the "High" pulse signal indicating switching. However, the error pulse determination information s32 may be information designating a modulation scheme which is a switching destination based on the error rate.

When switching of a modulation scheme occurs in error pulse switching determination due to rapid line deterioration (time t4 and time t6), the complex modulation scheme determination unit 121 instantly reduces the modulation multi-value number. The operation is described below.

In FIG. 9, rapid CNR deterioration occurs between the time t3 and the time t5. However, since determination based on a CNR requires average value calculation in an interval section, the CNR modulation scheme determination unit 122 converts, at the time t5, the CNR determination information s30 from 128 QAM to 64 QAM to reduce the modulation multi-value number.

At the time t4, since the line error rate exceeds the error threshold value as line condition is deteriorated, the error pulse determination information s32 outputs a pulse indicating that the number of occurrences of errors per unit time is equal to or greater than the threshold value.

As a result, the complex modulation scheme determination unit 121 can convert the determination modulation scheme information s12 at the time t4 which is earlier than a CNR interval period and reliability on rapid line deterioration is improved.

The first exemplary embodiment of the present invention described above has an advantageous effect described below.

The first effect is improvement of line reliability.

The reason for the improvement is that the wireless transmission device of the exemplary embodiment uses an error pulse outputted at the time of error correction of a received signal as line quality information. By using the error pulse, it is possible to instantly detect fading which is difficult to determine using a CNR or a RSL and rapid line deterioration to reduce a modulation multi-value number. When line condition rapidly changes, the wireless transmission device of the first exemplary embodiment can instantly change a modulation scheme of a transmission device.

The second effect is that it is possible to obtain a high system gain by increasing transmission power while keeping an adaptive modulation function.

The reason thereof is that the wireless transmission device of the first exemplary embodiment can determine a modulation scheme by concurrently using RSL determination information which is less affected by distortion even though a CNR is reduced due to distortion of a transmission wave which arrangement of high transmission power causes. That is, even if a CNR of a received signal is deteriorated due to distortion, the wireless transmission device of the first exemplary embodiment can convert into a more proper modulation scheme.

That is, when line condition rapidly changes or a CNR is deteriorated due to waveform distortion during transmission, the wireless transmission device of the first exemplary embodiment can choose a modulation scheme adapted to the line condition.

Here, a modified example of the first exemplary embodiment is described. In the descriptions above, the error pulse determination information s32 outputted by the error pulse switching determination unit 124 represents whether or not the number of occurrences of error pulses is equal to or greater than the threshold value. However, when the number of occurrences of error pulses is equal to or greater than the threshold value, the error pulse switching determination unit 124 may output a modulation scheme which is determined based on the received modulation scheme information s11 and information of the error pulse threshold value storage unit 402 to the complex modulation scheme determination unit 121 as the error pulse determination information s32. If the error pulse determination information s32 inputted from the error pulse switching determination unit 124 includes modulation scheme information, the complex modulation scheme determination unit 121 may output a modulation scheme indicated by the error pulse determination information s32 as the determination modulation scheme information s12 in priority to modulation schemes indicated by the CNR determination information s30 and the RSL determination information s31.

In another modified example of the first exemplary embodiment, the error correction encode unit 5 in the self-station 3 may switch positions with the modulation scheme information multiplex unit 6 therein. Similarly, the error correction encode unit 27 in the opposite station 17 may switch positions with the modulation scheme information multiplex unit 26 therein.

The RF unit 13 may be located in the self-station 3. Similarly, the RF unit 16 may be located in the opposite station 17.

Second Exemplary Embodiment

A second exemplary embodiment of the invention is described. A basic configuration of a wireless transmission device of the second exemplary embodiment of the invention is the same as that of the first exemplary embodiment. However, the second exemplary embodiment differs in a configuration of the modulation scheme determination unit.

Figure 10:
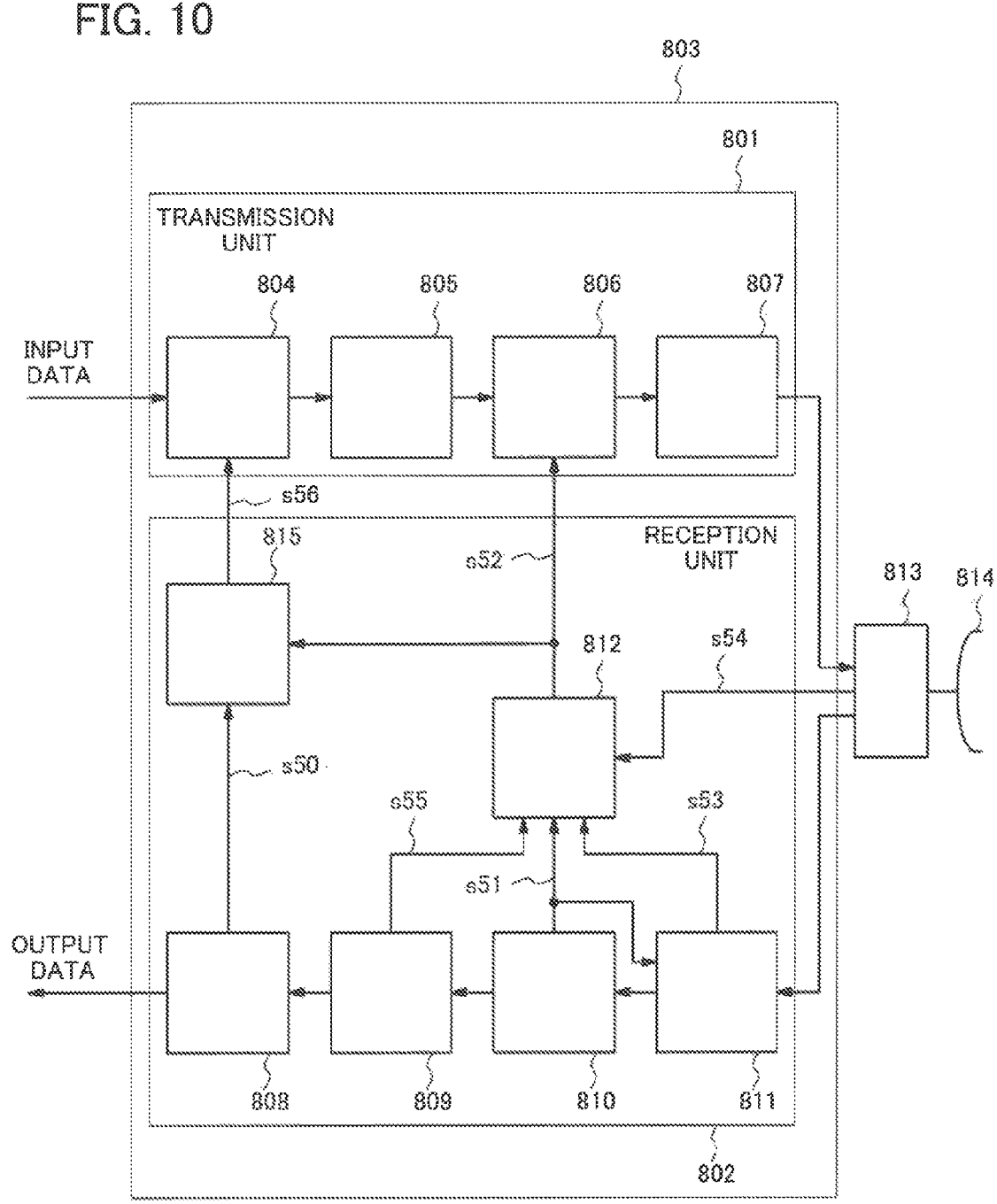
FIG. 10 is a configuration diagram of a wireless transmission device of a second exemplary embodiment.

FIG. 10 is a configuration diagram of the wireless transmission device 803 of the second exemplary embodiment. In FIG. 10, a transmission modulation scheme determination unit 815 is added to a reception unit 802 compared with the self-station 3 of the first exemplary embodiment shown in FIG. 1. The transmission modulation scheme determination unit 815 receives transfer modulation scheme information s50 extracted in a received data extraction unit 808 and determination modulation scheme information s52 outputted by a complex condition determination unit 812. The transmission modulation scheme determination unit 815 compares a modulation multi-value number of transfer modulation scheme information s50 with that of the determination modulation scheme information s52, chooses the modulation scheme with the smaller modulation multi-value number, and outputs it to a transmission data multiplex unit 804 as transmission modulation scheme information s56. The configuration and the operations on the wireless transmission device 803 other than the above descriptions thereon are the same as those on the self-station 3 explained with reference to FIG. 1.

The wireless transmission device 803 of the second exemplary embodiment makes it possible to give the smaller modulation multi-value number to the modulation schemes of communication in transmission and reception directions in accordance with the configuration in FIG. 10. For example, in a condition where a propagation environment of the both directions is deteriorated, like attenuation due to rainfall, it becomes possible to perform communication using a modulation scheme with higher reliability. As a result, the wireless transmission device 803 of the second exemplary embodiment can advantageously ensure higher reliability in addition to the effects described in the first exemplary embodiment.

The second exemplary embodiment may give priority to transmission speed instead of reliability. That is, the transmission modulation scheme determination unit 815 may compare a modulation multi-value number of transfer modulation scheme information s50 with that of the determination modulation scheme information s52, choose the modulation scheme with the greater modulation multi-value number, and output it to a transmission data multiplex unit 804 as transmission modulation scheme information s56.

In the first and second exemplary embodiments, a modulation scheme with a small modulation multi-value number is preferred when line condition is deteriorated, and a modulation scheme with a large modulation multi-value number is preferred when line condition is good. However, choice of a modulation scheme may be performed regardless of the modulation multi-value number. The modulation scheme may be preferred so that a highly reliable modulation scheme is chosen when line condition is degraded and a modulation scheme having a large transmission capacity is chosen when line condition is good.

In the first and the second exemplary embodiments, the invention is applied to a wireless transmission device. The present invention, however, is not limited to application to the wireless transmission device. For example, the present invention is also applicable to a wired transmission device.

Third Exemplary Embodiment

Next, a third exemplary embodiment of the invention is described.

Figure 12:
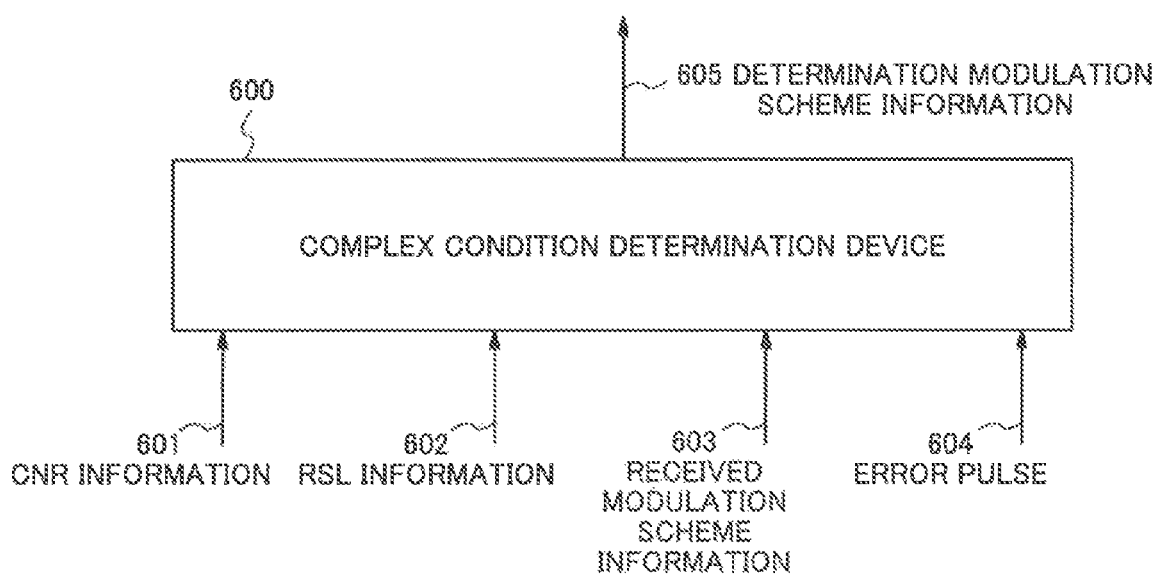
FIG. 12 is a configuration diagram of a complex condition determination device of a third exemplary embodiment.

FIG. 12 is a configuration diagram of a complex condition determination device of the third exemplary embodiment of the present invention.

In FIG. 12, a complex condition determination device 600 receives reception CNR information 601 indicating a CNR of a received signal and RSL information 602 indicating reception level information of the received signal. The complex condition determination device 600 further receives received modulation scheme information 603 indicating a modulation scheme of the received signal and an error pulse 604 indicating presence or absence of an error of the received signal. The complex condition determination device 600 outputs the modulation scheme determined based on the inputted information and the pulse as determination modulation scheme information 605 which is information indicating the modulation scheme to a transmission source of the received signal.

Figure 13:
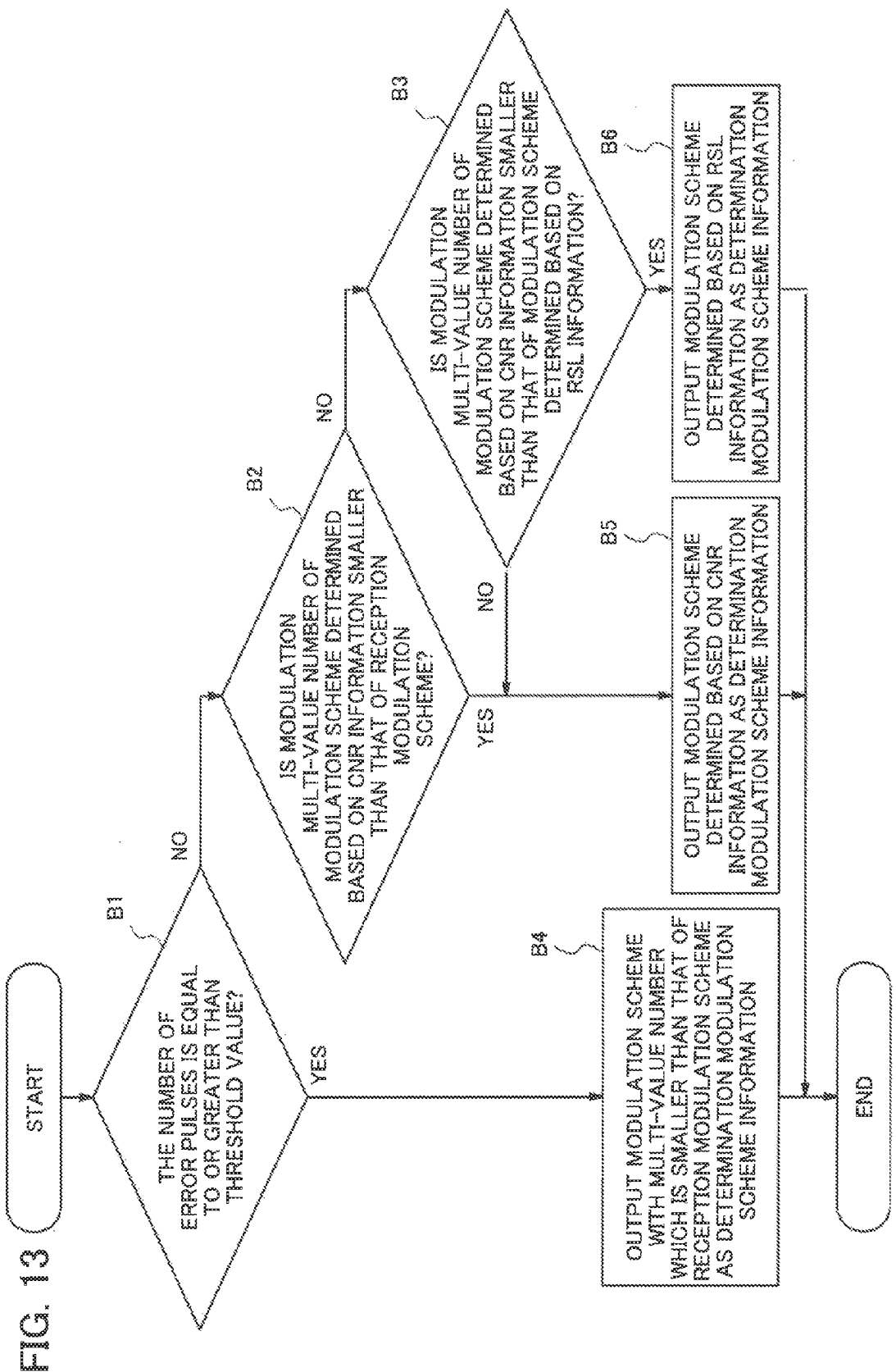
FIG. 13 is a flowchart illustrating an operation of a complex condition determination device.

FIG. 13 is a flowchart illustrating operations of the complex condition determination device 600.

The error pulse 604 directly reflects presence of an error in a data frame. If an error occurs in the data frame due to rapid line deterioration, the error pulse 604 instantly occurs. The complex condition determination device 600 determines whether or not an accumulated number of the number of the error pulses 604 per unit time is equal to or greater than a threshold value (step B1). If the number of the error pulses 604 which occurs per unit time is equal to or greater than the threshold value (step B1: YES), it is determined that rapid line deterioration occurs, and the modulation scheme whose modulation multi-value number is smaller than that of the modulation scheme indicated by the received modulation scheme information 603 is outputted as the determination modulation scheme information 605 (step B4).

When the number of occurrences of the error pulses 604 is smaller than the threshold value (step B1: NO), the complex condition determination device 600 compares the modulation multi-value of the modulation scheme determined based on the CNR information 601 with the modulation multi-value number of the reception modulation scheme 603 (step B2). If the modulation multi-value determined based on the CNR information 601 is smaller than that of the reception modulation scheme 603 (step B2: YES), the modulation scheme determined based on the CNR information 601 is outputted as the determination modulation scheme information 605 (step B5).

If the modulation multi-value of the modulation scheme determined based on the CNR information 601 is equal to or greater than the modulation multi-value number of the reception modulation scheme 603 (step B2: NO), the complex condition determination device 600 compares the modulation multi-value of the modulation scheme determined based on the CNR information 601 with the modulation multi-value number of the modulation scheme determined based on the RSL information 602 (step B3).

If the comparison result shows that the modulation multi-value of the modulation scheme determined based on the CNR information 601 is smaller than the modulation multi-value number of the modulation scheme determined based on the RSL information 602 (step B3: YES), the complex condition determination device 600 outputs the modulation scheme determined based on the RSL information 602 as the determination modulation scheme information 605 (step B6).

If the modulation multi-value of the modulation scheme determined based on the CNR information 601 is equal to or greater than the modulation multi-value number of the modulation scheme determined based on the RSL information 602 (step B3: NO), the complex condition determination device 600 outputs the modulation scheme determined based on the CNR information 601 as the determination modulation scheme information 605 (step B5).

As described above, the complex condition determination device 600 of the third exemplary embodiment chooses a modulation scheme with higher reliability and a smaller modulation multi-value number and outputs it as the determination modulation scheme information 605, when the number of generated error pulses is equal to or greater than the threshold value, or when the modulation multi-value of the modulation scheme determined based on the CNR information 601 is smaller than the modulation multi-value number of the reception modulation scheme.

On the other hand, the complex condition determination device 600 of the third exemplary embodiment chooses the modulation scheme with a larger transmission capacity and a larger modulation multi-value number and outputs it as the determination modulation scheme information 605, when the number of the generated error pulses 604 is less than the threshold value.

Consequently, the complex condition determination device of the third exemplary embodiment can quickly choose a modulation scheme even if line condition rapidly changes.

The complex condition determination device of the third exemplary embodiment compares the modulation multi-value of the modulation scheme determined based on the CNR information 601 with the modulation multi-value number of the modulation scheme determined based on the RSL information 602, and outputs the modulation scheme with the larger modulation multi-value number as the determination modulation scheme information 605. As a result, like the first and the second exemplary embodiments, the complex condition determination device of the third exemplary embodiment can choose the modulation scheme with the larger modulation multi-value number based on the RSL information 602 even though a CNR of a received signal is deteriorated.

That is, even when line condition rapidly changes or a CNR is deteriorated due to waveform distortion during transmission, the third exemplary embodiment can choose a modulation scheme adapted to the line condition advantageously.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-289089 filed on Dec. 21, 2009, the disclosure of which is incorporated herein in its entirety by reference.

REFERENCE SIGNS LIST

1, 19 transmission unit
2, 18 reception unit
3 self-station
4, 28 transmission data multiplex unit
5, 27 error correction encode unit
6, 26 modulation scheme information multiplex unit
7, 25 modulation unit
8, 23 reception data extraction unit
9, 22 error correction decode unit
10, 21 modulation scheme information extraction unit
11, 20 demodulation unit
12, 24 complex condition determination unit
17 opposite station
13, 16 RF unit
14, 15 antenna
70 CPU
71 memory
121 complex modulation scheme determination unit
122 CNR modulation scheme determination unit
123 RSL modulation scheme determination unit
124 error pulse switching determination unit
201 CNR modulation scheme determination unit
202 CNR threshold value comparison unit
203 CNR threshold value storage unit
204 CNR average value calculation unit
301 RSL modulation scheme determination unit
302 RSL threshold value comparison unit
303 RSL threshold value storage unit
304 RSL average value calculation unit
401 error pulse threshold value comparison unit
402 error pulse threshold value storage unit
403 error pulse accumulation unit
500 wireless frame
501 overhead
600 complex condition determination device
601 CNR information
602 RSL information
603 received modulation scheme information
604 error pulse
605 determination modulation scheme information
801 transmission unit
802 reception unit
803 wireless transmission device
804 transmission data multiplex unit
805 error correction encode unit
806 modulation scheme information multiplex unit
807 modulation unit
808 reception data extraction unit
809 error correction decode unit 810 modulation scheme information extraction unit
811 demodulation unit
812 complex condition determination unit
813 RF unit
814 antenna
815 transmission modulation scheme determination unit
900, 901 output data
910, 911 input data
s10, s22 transmission modulation scheme information
s11, s21 received modulation scheme information
s12, s20 determination modulation scheme information
s13, s23 CNR information
s14, s24 RSL information
s15, s25 error pulse
s30 CNR determination information
s31 RSL determination information
s32 error pulse determination information
s40, s401~s404 transmission modulation scheme information region
s41, s411~s414 transfer modulation scheme information region
s42 payload
s50 transfer modulation scheme information
s51 received modulation scheme information
s52 determination modulation scheme information
s53 CNR information
s54 RSL information
s55 error pulse
s56 transmission modulation scheme information

The invention claimed is:

1. A complex condition determination unit, comprising:
an error-pulse switching determination unit that outputs, as error-pulse determination information, information indicating whether an accumulated value of the number of error pulses accumulated over a predetermined period is equal to or greater than a predetermined error-pulse threshold value, the error pulses indicating whether an error exists in a received signal;
CNR (Carrier to Noise Ratio, i.e. carrier-wave power to signal power ratio) modulation scheme determination unit that outputs, as CNR determination information, a modulation scheme determined in accordance with a predetermined CNR threshold value and CNR information indicating a CNR of the received signal;
RSL (Received Signal Level) modulation scheme determination unit that outputs, as RSL determination information, a modulation scheme determined in accordance with a predetermined RSL threshold value and RSL information indicating a RSL of the received signal; and
complex modulation scheme determination unit that determines the modulation scheme for a transmission source of the received signal, in accordance with the error-pulse determination information, the CNR determination information, the RSL determination information, and received modulation scheme information indicating the modulation scheme of the received signal.

2. The complex condition determination unit of claim 1, wherein the complex condition determination unit
determines a modulation scheme whose modulation multi-value number is smaller than that of the received modulation scheme as the modulation scheme for the transmission source of the received signal, when the error-pulse determination information indicates that the accumulated value is equal to or greater than the predetermined error-pulse threshold value,
determines a modulation scheme indicated by the CNR determination information as the modulation scheme for the transmission source of the received signal, when the error-pulse determination information indicates that the accumulated value is smaller than the predetermined error-pulse threshold value and a modulation multi-value number of the modulation scheme indicated by the CNR determination information is smaller than a modulation multi-value number of the modulation scheme indicated by the received modulation scheme information, and
determines a modulation scheme indicated by the RSL determination information as the modulation scheme for the transmission source of the received signal, when the error-pulse determination information indicates that the accumulated value is smaller than the error-pulse threshold value, the modulation multi-value number of the modulation scheme indicated by the CNR determination information is equal to or greater than the modulation multi-value number of the modulation scheme indicated by the received modulation scheme information, and the modulation multi-value number of the modulation scheme indicated by the CNR determination information is smaller than a modulation multi-value number of the modulation scheme indicated by the RSL determination information.

3. The complex condition determination unit of claim 1, wherein the CNR information is greater than a threshold value of the CNR corresponding to the modulation scheme indicated by the CNR determination information.

4. The complex condition determination unit of claim 1, wherein the RSL information is greater than a threshold value of the RSL corresponding to the modulation scheme indicated by the RSL determination information.

5. The complex condition determination unit of claim 1, wherein the complex modulation scheme determination unit outputs the determined modulation scheme as first determination modulation scheme information.

6. A transmission device, comprising:
a demodulation unit for outputting CNR information indicating a CNR of a received signal;
a RSL output unit for outputting RSL information indicating a RSL of the received signal;
a modulation scheme information extraction unit for outputting received modulation scheme information indicating a modulation scheme of the received signal;
an error correction decode unit for outputting an error pulse;
a received data extraction unit for outputting second determination modulation scheme information that is information instructing a modulation scheme of a transmitted signal transmitted to a transmission source of the received signal, and that is multiplexed with the received signal; and
a complex condition determination unit of claim 1.

7. A transmission device, comprising:
a modulation scheme information multiplex unit for multiplexing transmission data with a modulation scheme for a transmission source of a received signal;
a modulation unit for modulating the transmission data based on a modulation scheme corresponding to second determination modulation scheme information instructing a modulation scheme of a self-device; and
a complex condition determination unit of claim 1.

8. A complex condition determination method, comprising the steps of:
determining a modulation scheme whose modulation multi-value number is smaller than that of a modulation scheme of a received signal indicated by received modulation scheme information as a modulation scheme for a transmission source of the received signal, when an accumulated value of the number of error pulses accumulated over a predetermined period is equal to or greater than a predetermined error-pulse threshold value, the error pulses indicating whether an error exists in the received signal;

determining a modulation scheme indicated by CNR determination information as the modulation scheme for the transmission source of the received signal, when the accumulated value is smaller than the predetermined error-pulse threshold value and a modulation multi-value number of the modulation scheme indicated by the CNR determination information is smaller than the modulation multi-value number of the modulation scheme of the received signal, the CNR determination information being determined based on a CNR of the received signal; and determining a modulation scheme indicated by RSL determination information as the modulation scheme for the transmission source of the received signal, when the accumulated value is smaller than the error-pulse threshold value, the modulation multi-value number of the modulation scheme indicated by the CNR determination information is equal to or greater than the modulation multi-value number of the modulation scheme indicated by the received modulation scheme information, and the modulation multi-value number of the modulation scheme indicated by the CNR determination information is smaller than a modulation multi-value number of a modulation scheme indicated by RSL determination information determined based on an RSL of the received signal.

9. The complex condition determination method of claim 8, wherein the CNR information is greater than a threshold value of the CNR corresponding to the modulation scheme indicated by the CNR determination information.

10. The complex condition determination method of claim 8, wherein the RSL information is greater than a threshold value of the RSL corresponding to the modulation scheme indicated by the RSL determination information.

11. The complex condition determination method of claim 8, wherein the determined modulation scheme is outputted as a first determination modulation scheme information.

* * * * *